April 21, 1959

A. J. JARVIS ET AL 2,883,125

COMPOSITE AIRCRAFT

Filed Jan. 14, 1954

INVENTORS.
ALVIN J. JARVIS
JOSEPH W. STRAAYER
BY
Reynolds, Beach & Christensen
ATTORNEYS

INVENTORS.
ALVIN J. JARVIS
JOSEPH W. STRAAYER

ATTORNEYS

INVENTORS.
ALVIN J. JARVIS
JOSEPH W. STRAAYER
BY
ATTORNEYS

April 21, 1959     A. J. JARVIS ET AL     2,883,125
COMPOSITE AIRCRAFT

Filed Jan. 14, 1954     4 Sheets-Sheet 4

INVENTORS.
ALVIN J. JARVIS
JOSEPH W. STRAAYER
BY
Reynolds, Beach & Christensen
ATTORNEYS

United States Patent Office 2,883,125
Patented Apr. 21, 1959

2,883,125

COMPOSITE AIRCRAFT

Alvin J. Jarvis, Seattle, Wash., and Joseph W. Straayer, Birmingham, Mich., assignors to Boeing Airplane Company, Seattle, Wash., a corporation of Delaware Application January 14, 1954, Serial No. 404,030

10 Claims. (Cl. 244—2)

This invention relates to a method and means for controlling aircraft flight, and more particularly the flight of a pilotless airplane. The invention is herein illustratively described by reference to the presently preferred form thereof, but it should be understood that certain changes and variations therein may be made without departing from the underlying essentials involved.

The guidance of aerodynes, such as pilotless airplanes by remote control through radio means and the like has reached an advanced stage but is not well suited for long distance flights. This is especially true if the destination is a particular objective as small or localized from the vantage point of the control station as a specific bombing target, for instance. Moreover, conditions may arise unforeseen requiring decisions and changes of plans which could not be detected or acted upon from a remote station. As a result of the shortcomings of long-distance remote control methods, it has been necessary to plan and conduct intercontinental bombing missions and the like by piloted airplanes, a hazardous occupation for pilots and their crews.

An airplane suitable for intercontinental bombing missions of course is not as fast nor maneuverable as desired for the safety of the pilot. Nor are its speed and maneuverability sufficiently increased for that purpose after discharge of a bomb load, because the airplane still carries a large supply of fuel in order to make the return trip and constitutes a large, easily detected and relatively cumbersome target. While such airplanes at times may escape early detection by following a tactical approach to the target, they can hardly avoid notice and attack after reaching and bombing the target. Furthermore, during the bombing run itself, a large bomber airplane is particularly vulnerable because of the necessity of maintaining a steady course while under control of the bombsight computer, until reaching the bomb-release point. Modern electronic computers are of great assistance in shortening the bombing run but do not eliminate this problem altogether.

Among other useful applications, the present invention provides a method and means whereby a human pilot in a separate airplane may accompany and control an aerodyne, such as a large airplane on a long distance bombing mission or the like without subjecting himself to the intense vulnerability usually encountered. More specifically, the invention provides a practicable way for a pilot personally to guide a large bomber airplane to the target and yet make the return flight in a small and speedy escape airplane just large enough to carry its own equipment, the pilot and the necessary return-flight fuel. Moreover, fuel for the flight to the target by both airplanes may be carried and supplied by the large airplane, thereby further reducing the fuel-carrying requirements of the piloted airplane.

In another aspect, the present invention enables a bombing airplane to be directed to a target accurately and there be expended as a self-destruction bomb without unusually endangering the pilot. According to the invention it is possible for the pilot to accomplish this result and make his break for an escape in another airplane, leaving the control of the bomber's final approach to the target to its automatic gyro flight controls or to radar homing flight controls, as the case may be. With this technique of bombing, it is possible for one person alone to accomplish a major intercontinental bombing mission.

Moreover, very substantial weight savings are realized by the proposed technique if the bomber airplane is to be expended at the objective because of the fact that the heavy landing gear on the large airplane may be jettisoned after take-off, but primarily because the great amount of fuel usually required to return such an airplane to its base of safety need not be carried on the flight out to the target.

Other important objects of the invention include a method and means for safely and effectively controlling the flight of an airplane from another airplane by direct physical connecting means, for accomplishing this result in a manner requiring no operating connections between the second airplane and the control surface actuating mechanisms of the first airplane, and for attaining these ends in a positive, reliable and relatively simple manner without necessarily requiring modified airplane construction in any basic sense.

According to this invention a power driven pilotless airplane may be successfully controlled in flight with its control surfaces locked in fixed position.

Still another object is to provide a method and means with which the operating connection between such airplanes and the flight arrangement or positional relationship of the two airplanes in flight are such that the piloted airplane may be safely and quickly detached from the pilotless airplane or drone at any desired instant. Thus in the case of bombing missions carried out with this arrangement, the pilot may free his own "minimum" airplane from the drone or bomber airplane at the desired instant of time and return to a base of safety. If for reasons of safety or otherwise the two airplanes have been disconnected before setting the bomber airplane on a direct run to the target, the pilot may still be able to guide the bomber airplane in its final approach to the target using radio remote controls.

A highly important object of the invention is an effective method and means by which the flight of one separately power driven airplane may be controlled directly by the flight of a second separately power driven airplane flown in normal manner and without benefit of any operating connections between the two other than a single direct physical connection.

The novel flight control method achieving the foregoing and other objectives, as will be apparent to those skilled in the art, comprises the direct application of forces by the piloted airplane to a fixed point or location on the structure of the drone, namely a point offset both longitudinally from the latter's center of gravity and vertically from the latter's longitudinal axis, such forces being directed up, down or to either side according to the desired change of direction. In the preferred embodiment of the invention, these forces are applied to the drone by a direct physical connection between the two airplanes in the nature of a universal or flexible coupling having a center of pivot located for greatest effectiveness at or near the center of gravity of the piloted airplane. Such a coupling causes the airplanes to move conjointly in translation in any direction while permitting relative angular movement therebetween. In the preferred embodiment, the point of connection on the drone is located forward of its center of gravity and above its longitudinal axis, a location having the unique advantage that the piloted airplane may be flown in the normal manner and when its control surfaces are moved to produce corrective flight control, the piloted airplane as a whole produces a resultant force applied through the coupling means to the drone and acts on the drone as if it were produced by the drone's own airfoil surfaces. Thus climb of the piloted airplane applies a control force to the drone, effective through mechanically favorable leverage, to increase the angle of attack of its main airfoil and causes it to enter a climb, and reversely an attempted dive of the piloted airplane produces a mechanical moment in the drone about its center of gravity causing the latter to enter a dive as if operated by its own flight control surfaces. Similarly, a bank turn to either side by the piloted airplane applies a roll torque about the drone's longitudinal axis and a turning moment about the drone's vertical central axis, resulting in a like bank turn by the drone. In other words with the preferred connecting arrangement the pilot flies his own airplane in the normal manner and in the manner in which the drone is to be flown. With other connecting points that might be selected on the drone, one or more of the resultant flight control forces applied to the drone will be reversed with respect to the corresponding main forces generated by the piloted airplane, such that control operation of the piloted airplane in one or more senses must be carried out in the reverse of normal in order to accomplish a particular maneuver of the drone. This is ordinarily to be avoided because of the strain on the pilot and the possibility of forgetfulness in emergencies.

Because the main forces sustaining flight of the piloted airplane provide a resultant which acts directly on the drone in a manner equivalent to the action of the drone's own control surfaces, the piloted airplane may be small in comparison to the drone. It is also possible, however, to control the flight of a small airplane from a large one and the novel control principle involved is not necessarily limited to airplanes of any particular relative sizes nor types.

Preferably both airplanes are power driven by their own separate means of propulsion during combined flight. Despite this normal mode of practicing the invention any moderate tendency for the piloted airplane to fly faster or slower than the drone does not materially or seriously alter the effective flight control forces on the drone. This is true because if the connecting point on the drone is properly selected any purely forwardly or rearwardly directed forces, caused by engine speed differentials, applied to the drone can produce but a small component normal to the effective moment arm represented by a line passing through the drone's cneter of gravity and its connecting point to the piloted airplane. Thus precise equalization of the effective engine speeds of the two separately powered airplanes flown together according to this invention is not an essential.

If desired, the drone may carry a pilot, though during combined flight he would not be called upon to operate the drone's flight controls, hence the drone is not "piloted" in the usual sense of that term during flight of the composite arrangement.

Further features of the invention reside in the provision of yieldable struts or equivalent brace means interconnecting the two airplanes to support the piloted airplane in flyable position on or from the drone before and during take-off, that is until the piloted airplane and drone become aerodynamically controllable. Thereafter such brace means are disconnected or rendered ineffective in order to permit pivoting of one airplane more freely or through a wider range relative to the other. These struts or other control means may be jettisoned in flight if desirable.

These and other features, objects and advantages of the invention will become more fully evident from the following description thereof by reference to the accompanying drawings.

Figure 1:
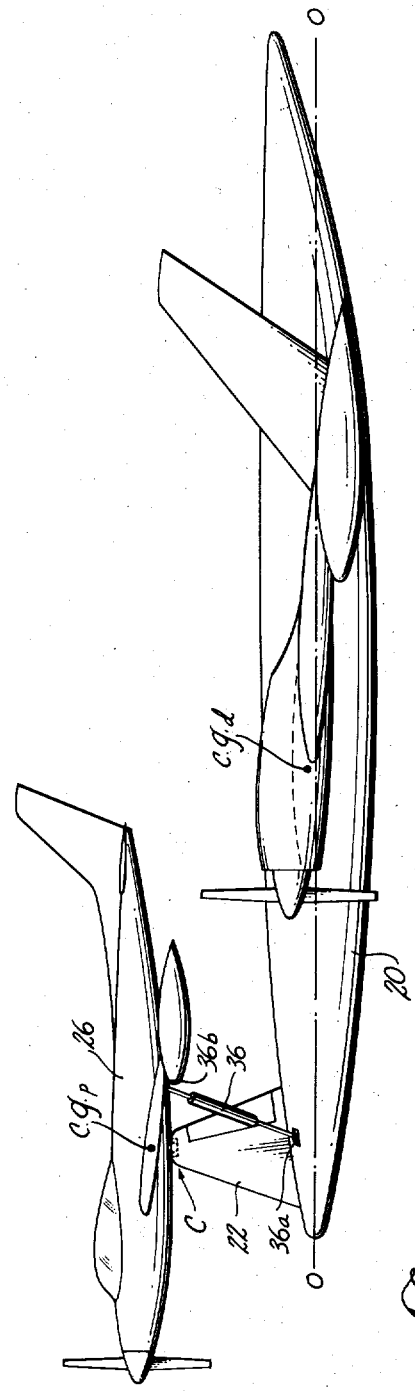
Figure 1 is a simplified side elevation view of two airplanes interconnected for combined flight according to the invention.

In the example shown in Figure 1, the drone airplane, that is the unpiloted airplane 20, is of the type employing the canard arrangement of flight control surfaces. A vertical fin 22 mounted on the nose of the drone airplane provides a point of support for a universal coupling including a means 24 mounted on the tip or upper end of this fin. The piloted airplane 26 for guiding the drone during combined flight carries a complemental universal coupling means 28 releasably engageable with the means 24. The universal coupling means 28 of the piloted airplane is located at the bottom of its fuselage and in the vicinity of its center of gravity C.G.$p$. The point of interconnection C between the airplanes in this preferred arrangement is thereby offset materially forward of the drone airplane's center of gravity C.G.$d$ and materially above its longitudinal axis O—O while being located near or at the piloted airplane's center of gravity C.G.$p$ such that the latter is permitted to assume a normal flight position while exerting its maximum force potentialities for control of the drone.

Figure 3:
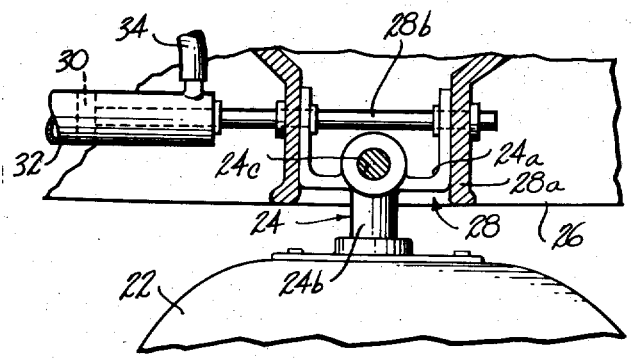
Figure 3 is a sectional detail of a detachable universal coupling means.

The universal coupling means in the belly of the piloted airplane comprises the rigid base 28$a$ (Figure 3) in which the yoke 24$a$ is free to pivot through the required range on a trunnion pin 28$b$ extending through base journal holes longitudinally of the airplane 26. The upright coupling post 24$b$ rigidly mounted on the fin tip of the drone includes a pin socket at its upper end pivotally connected to the swinging yoke 24$a$ by means of a second trunnion pin 24$c$ disposed perpendicular to the pin 28$b$ and located beneath the latter sufficiently to provide the necessary clearances. The pin 28$b$ is connected to a hydraulic piston 30 cooperating with a cylinder 32. By supplying hydraulic fluid under pressure through the conduit 34 to the cylinder the piston is displaced in a direction which slidably retracts the pin 28$b$ from its journal holes in the base 28$a$ and yoke 24$a$, thereby releasing the drone airplane from the piloted airplane. Control of the hydraulic fluid pressure source (not shown) actuating the piston 30 will ordinarily be by the pilot of the control airplane 26. As a safety precaution other release means may be provided to insure that the universal coupling may be disengaged when desired. The details of the basically well known type of universal coupling shown in Figure 3 are not intended necessarily to be complete nor are they essential to an understanding of the invention, since there are a variety of universal or flexible coupling mechanisms that may be used to interconnect the two airplanes in substantially fixed bodily relationship for conjoint translational movement in all directions while permitting universal relative angular movement of the piloted airplane relative to the drone.

With the two airplanes in combined flight they are individually sustained in flying position or attitude normally by their own self-generated aerodynamic forces. However, in the absence of complex means to bring the airplanes together after executing separate take-offs, special prop means are necessary in order to support the piloted airplane in flyable position when connected to the drone airplane on the ground and thereby enable the combination to take off together. Such prop or brace means are necessary because the universal coupling itself, in the illustrated form, at least, does not hold the piloted airplane in established flyable position relative to the drone airplane.

Preferably the means bracing or supporting the piloted airplane in flyable position relative to the drone airplane when the two are on the ground is of a yieldable nature so that during take-off it will be possible for the piloted airplane to change its angle of attack and execute the necessary other maneuvers relative to the drone airplane which apply the control forces necessary to the takeoff of the two together. On the other hand the range of relative angular movement permitted to the piloted airplane should not be restricted after the two have attained a ground speed at which the drone airplane becomes substantially airborne since from that time on the piloted airplane is preferably in control of both airplanes and should be capable of any required change of flight attitude for control purposes. Moreover, the piloted airplane from that time on requires no propping or bracing in order to maintain it in flyable condition. It is desirable, therefore, to disconnect any such brace means or at least to render it ineffectual to restrict relative angular movement when the airplanes become aerodynamically controllable during take-off together.

Figure 4:
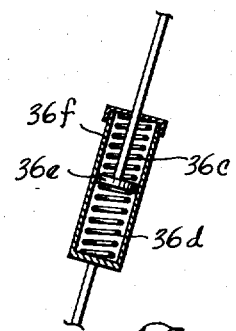
Figure 4 is a sectional detail of a resilient strut for bracing one airplane in flyable position relative to the other before and during take-off.

Preferably the yieldable brace means are in the form of a pair of spring-loaded struts 36 which extend from anchor points 36a on the fuselage of the drone adjacent respectively opposite sides of the fin 22, to laterally spaced anchor points 36b on the lower surfaces of the opposite wings of the piloted airplane. These struts incorporate pairs of loaded springs 36c and 36d acting oppositely as centering springs on a movable stop 36e slidable in a guide tube 36f (Figure 4) to permit such struts to vary in length as necessary to permit some change of attitude of the piloted airplane relative to the drone during the take-off. At the same time these strut springs are sufficiently stiff to prop up the piloted airplane in flyable position before and during take-off. Suitable means (not shown) for releasing the struts altogether from the airplanes, or from one of them, may be provided so that at the proper time the piloted airplane will be completely freed of all resistance to turning about the universal coupling point C as desired for control purposes. Any conventional or other means for disposing of the struts 36, such as retracting mechanisms in one of the airplanes or a parachute for carrying them off into space clear of the airplanes altogether, may be used for the purpose.

With reference to the diagrams shown in Figures 5 to 10, inclusive, it will be seen that the piloted airplane, which in the example is small in relation to the drone, constitutes an effective flight control surface for the drone. The drone's own flight control surfaces are preferably fixed or rigid during combined flight and all maneuvers are controlled solely by the piloted airplane's control surfaces.

Figure 5:
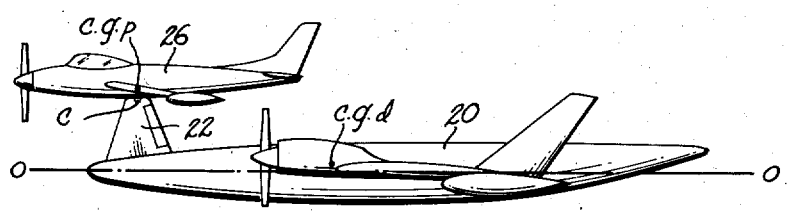
Figures 5, 6 and 7 are diagrammatic side elevation views, Figures 8 and 9 diagrammatic front elevation views and Figure 10 a diagrammatic plan view illustrating control operation of the piloted airplane with respect to the drone.

In Figure 5 the piloted airplane and drone are shown in normal level flight positions interconnected, as previously described, at pivot point C.

Figure 6:

In Figure 6 the piloted airplane 26 has instantaneously assumed climbing attitude while the drone is still in level flight or at a lesser climb angle. Under these conditions the airfoil surfaces of the piloted airplane generate a greater lift force than the actual line of flight of the combined airplanes requires for the piloted airplane to fly in the actual line of flight. Therefore a net resultant lift force or component thereof $Fl$ exists which is applied through the coupling point C to the drone airplane. The net lift force component $Fl$ of interest exists at right angles to the moment arm $Ml$ representing the straight line between the points C and $C.G.d$ and creates a moment about a transverse axis through the drone's center of gravity $C.G.d$, causing the nose of the drone to be lifted just as the normal control surfaces of the drone itself, if operated for that purpose, would cause the nose to elevate. This increases the angle of attack of the main airfoil surfaces of the drone and the large and heavy drone therefore slavishly follows the climb of the relatively small piloted airplane. In other words, due to the fact that the point C is located well forwardly of the drone's center of gravity ($C.G.d$) attempted climb of the piloted airplane produces a net resultant lift force on the drone which, because of the favorable mechanical advantage of this force on the drone easily increases the angle of attack of the drone's airfoils and causes the two airplanes to climb together. To accomplish this end the pilot operates his elevator controls in the normal sense but finds that he must over control or exaggerate his control movements and must expect a slower response thereto than ordinary. As in all flying the pilot will soon develop the "feel" of flying the composite airplane.

Figure 7:
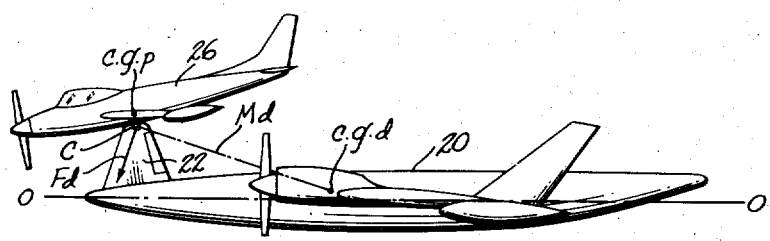

In Figure 7 the reverse maneuver is illustrated, namely that in which the piloted airplane is thrown into an attempted dive. In this case a net resultant downwardly acting force component generated by the main airfoil surfaces of the piloted airplane, force $Fd$, is applied at a moment arm $Md$ and results in a decreased angle of attack of the main airfoil surfaces of the drone. Thus the drone and piloted airplane are caused to descend, or to ascend at a lesser angle, as the case may be.

Figure 8:
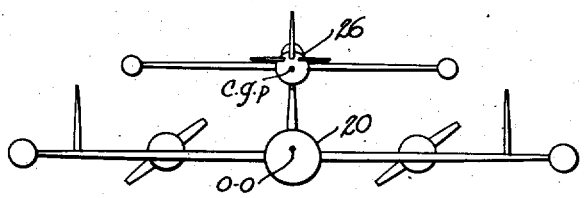
Figure 9:
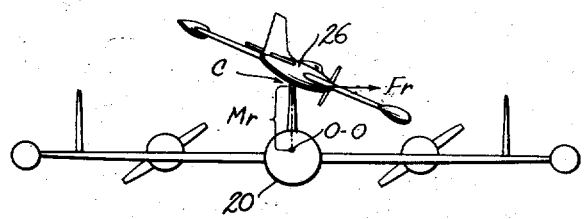
Figure 10:
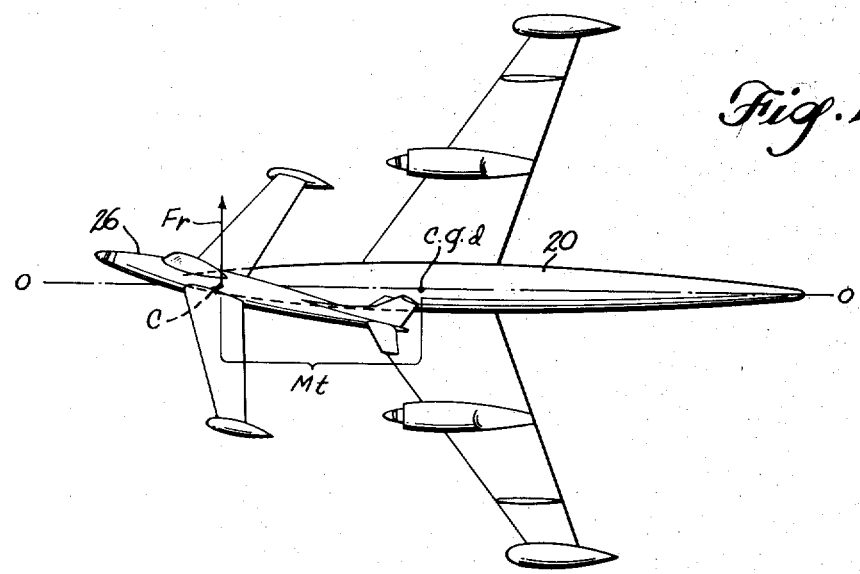

In Figure 8 the two airplanes are shown in a front elevation view in their normal or level flight positions. In Figure 9 the piloted airplane is shown in the process of executing a bank turn to the right. When it commences this attempted maneuver, the drone airplane of course does not at first change its flight because of its great inertia. Thus the flight attitude alone of the piloted airplane is the only instantaneous change occurring. However, as the piloted airplane's attitude changes appreciably relative to the drone two net moments are immediately generated which immediately thereafter start the drone in like maneuver. In Figure 9 the force component $Fr$ represents that initial component of the net resultant force applied by the piloted airplane to the drone through coupling point C which force component lies perpendicular to the longitudinal vertical mid-plane of the drone and is vertically offset from the drone's longitudinal axis O—O by a moment arm $Mr$ representing substantially the vertical distance between the point C and the axis O—O. The product of the force component $Fr$ and the moment arm $Mr$ represents the torque producing roll of the drone similar to casual roll of the piloted airplane. In Figure 10, the same force component $Fr$ appearing in plan view also produces a moment on the drone in the nature of a turning moment due to the fact that this force component is also applied at the end of a moment arm $Mt$ representing the longitudinal distance between the coupling point C and the drone's center of gravity $C.G.d$. Thus the drone slavishly follows the piloted airplane in a bank turn to the right.

A like force reaction in the reverse sense occurs when the piloted airplane executes a left bank turn. In either case the drone airplane is caused to follow the piloted airplane when the latter's controls are operated in the normal, if exaggerated, manner.

Thus it will be seen that the normal flight operation of the piloted airplane causes similar flight operation of the drone airplane when the coupling point C is located forwardly of the center of gravity and above the longitudinal axis of the drone. In general, referring to Figure 11, the coupling point C will be effective to accomplish this result if located in the general region designated Zone 1. The coupling point should not be located too close to the longitudinal axis of the drone airplane, however, because the moment arm for producing roll of the drone becomes too small to be effective. On the other hand the coupling point should not be located too near the transverse vertical plane passing through the drone's center of gravity either, because then the moment arm producing turn of the drone becomes too small to be effective; moreover, the moment arm producing lift and dive control forces on the drone would become shorter than desired unless the connecting point C were to be located so far out from the drone's fuselage radially as to be impracticable.

Figure 11:
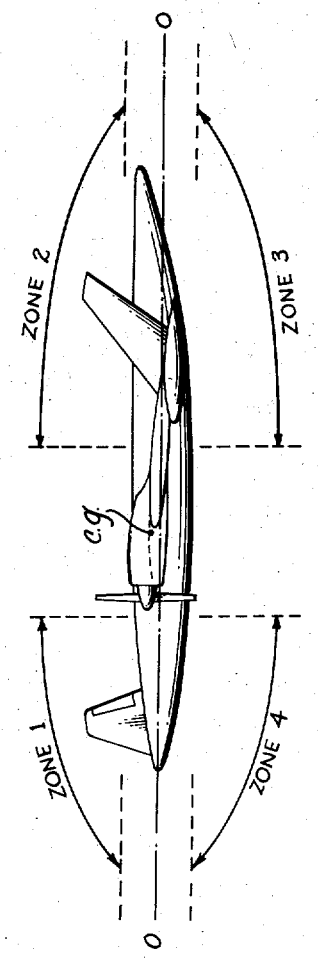
Figure 11 is a diagram to illustrate the feasible points for application of flight control forces to a drone airplane by a piloted airplane.
Figure 2:
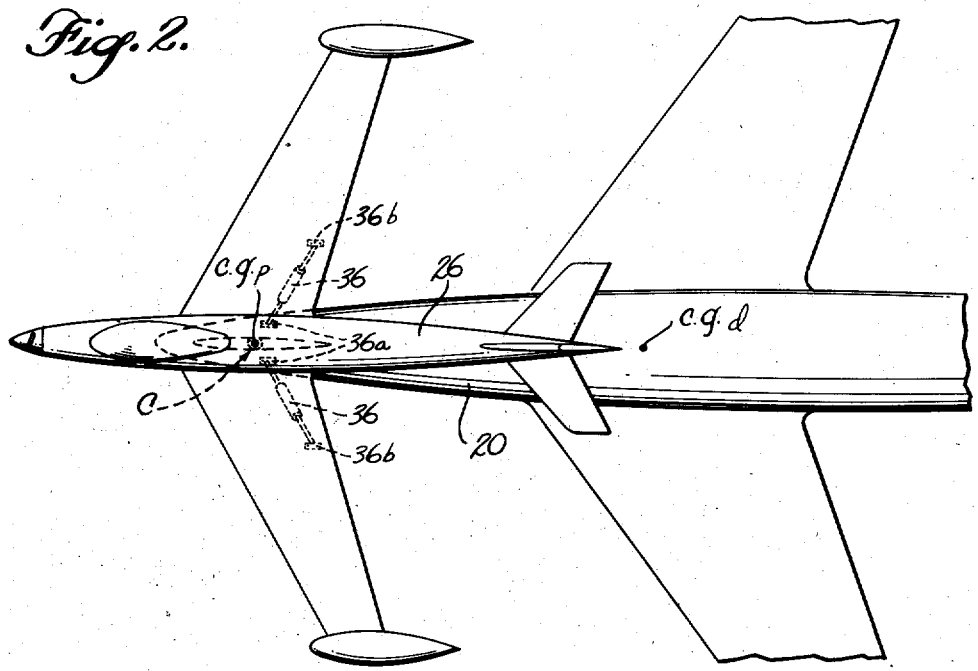
Figure 2 is a plan view of the interconnected airplanes, with a portion of the drone broken away for convenience of illustration.

As shown in Figure 11 there are three other zones in which the connecting point C may be located relative to the drone, but in each instance at least one of the forces controlling flight of the drone is reversed in respect to the corresponding flight control required of the piloted airplane. In Zone 2, representing the upper rear corner sector relative to the drone, the forces of climb and descent are reversed with respect to those of the piloted airplane. Moreover, the roll moments of the drone are such that if the piloted airplane is turned to the right for instance it will cause the drone to turn to the left but roll to the outside of the turn with the right wing dipped. This would cause a very undesirable sideslip and Zone 2 operation would therefore be unsuccessful. Zone 4 operation would likewise be unsuccessful in that the reaction of the drone to a turn of the piloted airplane would produce the same type of sideslip.

In Zone 3, representing that sector diagonally opposite Zone 1, the roll moments are reversed and the climb-descent moments are also reversed. No matter what the maneuver of the piloted airplane, the opposite maneuver will occur in the drone.

Thus Zone 1 relative to the drone is the only general region for the location of connecting point C in which all of the flight control forces produced by the piloted airplane are in the correct sense for similar flight control of the drone airplane in combined flight. Thus a location of point C in Zone 1 may be regarded as a practical necessity and certainly is ordinarily to be preferred over the other possible zonal regions. It is understood of course that all of the various possible zones for the connecting point between the two airplanes should preferably be located in the longitudinal vertical mid-plane of the drone in order to avoid an unbalance of forces between the airplanes impairing stable flight in normal attitudes. If point C is appreciably offset from this midplane, pure climb or descent changes of the piloted airplane would produce roll as well as climb or descent moments on the drone and would complicate the control operation. It is also understood, of course, that both airplanes are preferably power driven by their own engines at approximately equal effective engine velocities.

Figure 12:
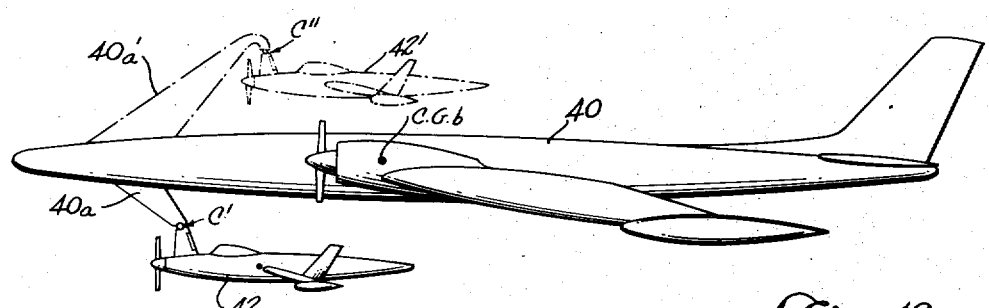
Figure 12 is a simplified side elevation view of a modified arrangement of airplanes representing another possible application of the invention.

It is assumed in the preceding example that the drone airplane is large by comparison to the piloted airplane, and in that instance it is very preferable that the connecting point on the piloted airplane be located as near as possible to its center of gravity so that it may fly normally and so that full advantage may be taken of the net forces produced by its main airfoils for controlling flight of the drone. In Figure 12 a reverse size relationship is assumed, that is, the piloted airplane 40 is illustrated as being much larger than the drone airplane 42. This may represent a situation for instance wherein a large bomber airplane requires fighter escort on long distance missions but the fuel-carrying capacity of such a fighter airplane is insufficient to permit it to accompany the bomber without special methods of refueling. To solve the problem the fighter airplane 42 may be carried by the bomber airplane until it is necessary to release it in order to engage an enemy attacking the bomber. The same control principles apply as in the previous example. In this case, however, since the piloted airplane's flight control surfaces may be as large or larger than the drone no change of altitude of the drone caused by application of force thereto by the piloted airplane could greatly influence their combined flight path, hence it will be essential in this case, with the drone's flight control surfaces fixed, that the connecting point C' be located in Zone 1 (see above) relative to the small drone. Otherwise the drone would be constantly "fighting" the control of the piloted airplane. Moreover, because the fighter airplane is small in relation to the bomber airplane it is not as important that the connecting point C' be located at or near the center of gravity of the bomber airplane (C.G.b). In the example it is located well forwardly of and well below this center of gravity point and this is permitted because the forces on or from the drone are not great relative to the normal sustaining forces of the large piloted airplane. A retractable support arm 40a carried by the piloted bomber 40 may be used in this case to provide a means for anchoring the drone airplane 42 thereto for combined flight.

In the dotted line position of the drone airplane 42' in Figure 12 the connecting point C'' is located forwardly of and above the piloted airplane's center of gravity (C.G.b), yet by providing an upwardly arched anchor arm 40a' the drone airplane is supported at a point relative to itself within Zone 1 (Figure 11) in which the control forces of the two airplanes are similar during combined flight. These and other possible ways and arrangements of interconnecting two airplanes of equal or unequal sizes for combined flight according to the invention, that is by flexible or universal coupling means requiring conjoint translational movement thereof in all directions while permitting at least temporary relative angular movement therebetween, will be obvious to those skilled in the art.

Figure 13:
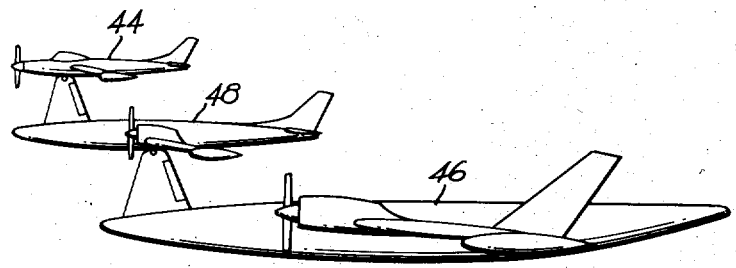
Figure 13 is a simplified side elevation view of still another modified arrangement of airplanes representing an extension of the basic flight arrangement to include more than two airplanes and permitting a very small airplane to control a very large one relative thereto.

As a further possibility, Figure 13 illustrates more than two airplanes interconnected for combined flight according to the invention. In this instance the piloted airplane 44 is very small in relation to the largest airplane 46 of the group, and in fact may be assumed in this example to be so small that it is incapable of providing adequate flight control forces for enslaving the airplane 46 directly. Thus in order to control the very large drone airplane 46 a third airplane 48 of intermediate size is connected between the two, such that the piloted airplane 44 controls the airplane 46 as a first drone, whereas the latter controls the airplane 46 as a second drone in a tandem arrangement.

These and other modifications and variations in the illustrated embodiments of the invention will be obvious to those skilled in the art.

We claim as our invention:

1. Means for controlling sustained flight of a separately power driven non-piloted airplane comprising, in combination, separately power driven non-piloted airplane, a piloted airplane also power driven independently of said first airplane and universal coupling means including a coupling element on the piloted airplane and a complemental coupling element on the first airplane engageable with the first coupling element for interconnecting the two airplanes directly to fly together conjointly in all directions of translation without appreciable freedom of relative translational movement permitted therebetween while permitting universal angular movement of the piloted airplane relative to the pilotless airplane, said coupling elements being located respectively in the vicinity of the center of gravity of the piloted airplane and near one end of the non-piloted airplane at a location in its longitudinal midplane and materially offset vertically from the longitudinal axis thereof, such that changes of flight angle of the piloted airplane relative to the non-piloted airplane generate forces effective as flight directional control forces applied to the first airplane producing corresponding changes of flight angle of the latter.

2. In combination, two airplanes, one comprising a powered non-piloted airplane having a universal coupling element fixedly mounted thereon at a location transversely centered and offset forwardly of its center of gravity and above its longitudinal axis, and the other comprising a powered piloted airplane having a complemental coupling element detachably engageable with the first coupling element and fixedly mounted on the second airplane in the vicinity of its center of gravity, whereby flight-sustaining aerodynamic forces of the second airplane in flight produce flight directing control forces on the first airplane, said coupling elements permitting relative angular movement and preventing appreciable variation in the relative translational positions of the two airplanes when connected together.

3. A composite aircraft comprising, in combination, an aerodyne, a piloted airplane, and universal coupling means including a coupling element on the piloted airplane and a complemental coupling element on the aerodyne engageable with the first coupling element for interconnecting the airplane and aerodyne directly to fly together in all directions of translation while permitting universal angular movement of the piloted airplane relative to the aerodyne, the universal coupling element on the aerodyne being substantially centered transversely thereon and located forwardly of the center of gravity and above its longitudinal axis, whereby changes of flight angle of the piloted airplane relative to the aerodyne generate forces effective on the latter as flight directional control forces producing similar changes of flight angle of the aerodyne.

4. The composite aircraft defined in claim 3, and pilot-controlled means operable to disengage the elements of the universal coupling to permit detachment of the piloted airplane from the aerodyne.

5. The composite aircraft defined in claim 4, wherein the aerodyne comprises an airplane having an upwardly projecting fin on the forward end portion thereof as a vertical stabilizer surface and the coupling element on such aerodyne is located substantially at the top of said fin.

6. The composite aircraft defined in claim 5, and brace means supporting the piloted airplane in flyable position relative to the aerodyne on the ground, said brace means being resiliently yieldable to permit limited angular movement of the airplane relative to the aerodyne by pivoting on the universal coupling means, during take-off, and being disconnectable to permit an increase in such relative angular movement in flight.

7. A composite aircraft comprising, in combination, an aerodyne, a piloted airplane, universal coupling means including a coupling element on the piloted airplane and a complemental coupling element on the aerodyne engageable with the first coupling element for interconnecting the airplane and aerodyne directly to fly together in all directions of translation while permitting universal angular movement of the piloted airplane relative to the aerodyne, said coupling elements being located relatively on the airplane and aerodyne such that changes of flight angle of the piloted airplane relative to the aerodyne generate forces effective as control forces applied to the aerodyne producing corresponding changes of flight angle of the latter, and brace means supporting the piloted airplane in flyable position relative to the aerodyne on the ground, said brace means being resiliently yieldable to permit limited angular movement of the airplane relative to the aerodyne by pivoting on the universal coupling means, during take-off, and being disconnectable to permit an increase in such relative angular movement in flight.

8. A composite aircraft comprising, in combination, an aerodyne, a piloted airplane, universal coupling means including a coupling element on the piloted airplane and a complemental coupling element on the aerodyne engageable with the first coupling element for interconnecting the airplane and aerodyne directly to fly together in all directions of translation while permitting universal angular movement of the piloted airplane relative to the aerodyne, the universal coupling element on the aerodyne being substantially centered transversely thereon and located forwardly of the center of gravity and above its longitudinal axis, whereby changes of flight angle of the piloted airplane relative to the aerodyne generate forces effective on the latter as flight directional control forces producing similar changes of flight angle of the aerodyne, and pilot-controlled means operable to disengage the elements of the universal coupling to permit detachment of the piloted airplane from the aerodyne.

9. A composite aircraft comprising an aerodyne of the type having an upwardly projecting fin on the forward end portion thereof as a vertical stabilizer surface, a piloted airplane, and universal coupling means including a coupling element on the piloted airplane and a complemental coupling element on the aerodyne engageable with the first coupling element for interconnecting the airplane and aerodyne directly to fly together conjointly in all directions of translation without appreciable freedom of relative translational movement permitted therebetween while permitting universal angular movement of the piloted airplane relative to the aerodyne, said coupling elements being located respectively in the vicinity of the center of gravity of the piloted airplane and in the vicinity of the top of the fin of the aerodyne, whereby changes of flight attitude of the piloted airplane relative to the aerodyne apply flight directional control forces to the aerodyne for producing corresponding and similar changes of flight attitude of the aerodyne for directing the flight of the latter.

10. A composite aircraft comprising an aerodyne, a piloted airplane, universal coupling means including a coupling element on the piloted airplane and a complemental coupling element on the aerodyne engageable with the first coupling element for interconnecting the airplane and aerodyne directly to fly together in all directions of translation while permitting universal angular movement of the piloted airplane relative to the aerodyne, the universal coupling element on the aerodyne being substantially centered transversely thereon and located forwardly of the center of gravity and above its longitudinal axis, whereby changes of flight angle of the piloted airplane relative to the aerodyne generate force effective on the latter as flight directional control forces producing similar changes of flight angle of the aerodyne, and disconnectable means normally fixing the angular position of the piloted airplane relative to the aerodyne for establishing substantially similar flight attitudes of the aerodyne and airplane on the ground preliminary to take-off, said last-mentioned means being releasable at will by the pilot of the piloted airplane.

References Cited in the file of this patent
UNITED STATES PATENTS

| | | |
|---|---|---|
| 1,418,783 | Fokker | June 6, 1922 |
| 1,926,968 | Causan | Sept. 12, 1933 |
| 2,385,392 | Van Dusen | Sept. 25, 1945 |
| 2,388,013 | Rasor | Oct. 30, 1945 |
| 2,436,988 | Bell | Mar. 2, 1948 |
| 2,443,114 | Notestein et al. | June 8, 1948 |
| 2,471,599 | Young | May 31, 1949 |
| 2,653,777 | Barkey | Sept. 29, 1953 |
| 2,692,094 | Brown | Oct. 19, 1954 |

FOREIGN PATENTS

| | | |
|---|---|---|
| 317,774 | Great Britain | Aug. 21, 1929 |
| 494,399 | Great Britain | Oct. 25, 1938 |